United States Patent

Baker et al.

Patent Number: 5,256,295
Date of Patent: Oct. 26, 1993

[54] TWO-STAGE MEMBRANE PROCESS AND APPARATUS

[75] Inventors: Richard W. Baker, Palo Alto; Johannes G. Wijmans, Menlo Park, both of Calif.

[73] Assignee: Membrane Technology & Research, Menlo Park, Calif.

[21] Appl. No.: 943,857

[22] Filed: Sep. 11, 1992

Related U.S. Application Data

[63] Continuation-in-part of Ser. No. 803,109, Dec. 5, 1991, Pat. No. 5,147,550, which is a continuation-in-part of Ser. No. 635,919, Dec. 28, 1990, Pat. No. 5,071,451.

[51] Int. Cl.$^5$ .............................................. B01D 53/22
[52] U.S. Cl. ...................................... 210/640; 95/45; 96/9; 96/10; 210/321.6
[58] Field of Search ................... 55/16, 23, 68, 158, 55/267–269; 210/640

[56] References Cited

U.S. PATENT DOCUMENTS

| | | | |
|---|---|---|---|
| 4,239,507 | 12/1980 | Benoit et al. | 55/16 |
| 4,386,944 | 6/1983 | Kimura | 55/16 |
| 4,553,983 | 11/1985 | Baker | 55/16 |
| 4,906,256 | 3/1990 | Baker et al. | 55/16 |
| 4,952,751 | 8/1990 | Blume et al. | 210/640 X |
| 4,994,094 | 2/1991 | Behling et al. | 55/16 |
| 5,030,356 | 7/1991 | Blume et al. | 210/640 |
| 5,032,148 | 7/1991 | Baker et al. | 55/16 |
| 5,069,686 | 12/1991 | Baker et al. | 55/16 |
| 5,071,451 | 12/1991 | Wijmans | 55/16 |
| 5,089,033 | 2/1992 | Wijmans | 55/16 |
| 5,129,921 | 7/1992 | Baker et al. | 55/16 |
| 5,147,550 | 9/1992 | Wijmans et al. | 210/640 |
| 5,151,190 | 9/1992 | Seiryo | 210/640 |
| 5,169,533 | 12/1992 | Baker et al. | 210/640 |

*Primary Examiner*—Robert Spitzer
*Attorney, Agent, or Firm*—J. Farrant

[57] ABSTRACT

A membrane separation process and system for removing a component from a fluid stream. An auxiliary membrane module or set of modules is installed across the second stage of a two-stage membrane separation system. The driving force for the auxiliary modules is provided by the pump or other driving unit for the first membrane stage. The auxiliary module or modules provides additional treatment of the residue stream from the second membrane stage, but are driven by the first stage driving unit. The invention is particularly useful in any membrane separation operation involving gas separation, vapor separation or pervaporation in which a two-stage system design is to be used, and where it is desirable to improve the efficiency of the two-stage system.

29 Claims, 5 Drawing Sheets

TWO-STAGE MEMBRANE PROCESS AND APPARATUS

This application is a continuation-in-part of U.S. patent application Ser. No. 803,109, "Membrane Process and Apparatus for Removing A Component from A Fluid Stream", filed Dec. 5, 1991, now U.S. Pat. No. 5,147,550, issued Sep. 15, 1992, which is a continuation-in-part of U.S. patent application Ser. No. 635,919, "Membrane Process and Apparatus for Removing Vapors from Gas Streams", filed Dec. 28, 1990, U.S. Pat. No. 5,071,451, issued Dec. 10, 1991. The contents of both parent applications are incorporated herein by reference in their entirety.

BACKGROUND OF THE INVENTION

Vapor Separation

Gas streams containing condensable vapors, such as water vapor, sulfur dioxide, ammonia or organic vapors, arise from numerous industrial and commercial processes. One method of removing the vapor from the gas stream is by means of a membrane separation step, followed by condensation of the vapor-enriched stream from the membrane separation step.

A typical membrane vapor separation system includes a membrane unit, a pump for lowering the pressure on the permeate side of the membrane, and a condenser for liquefying the vapor. The vapor concentration in the condenser vent gas after the condensation step depends on the vapor/liquid equilibrium at the operating conditions under which the condensation is performed. It is frequently the case that the condenser vent gas contains a much higher concentration of vapor than the original feed gas. The vent gas is often recirculated to the feed side of the membrane unit for further treatment.

There are several problems associated with returning the condenser vent gas to the membrane feed. First, the more concentrated is the vent gas compared with the feed gas, the less efficient the system becomes. Suppose, for example, the feed gas contains 2% vapor, the vapor-enriched stream from the membrane separation step contains 20% vapor, and the vent gas from the condenser contains 10% vapor. Then about half of the amount of vapor removed and concentrated by the membrane is recirculated to the front of the membrane. Much of the separation achieved by membrane is then negated, resulting in increased membrane area and pump capacity requirements for the system.

What can be done to handle the condenser vent gas stream is to pass it to a second membrane stage. This stage can be designed to produce a discharge stream with a concentration about the same as the original feed, so as to minimize the impact of the recycled stream on the total process. The vapor-enriched stream from the second membrane stage is in turn condensed, and the vent gas from the second condenser is returned to the feed of the second membrane unit. Such an arrangement is shown, for example, in U.S. Pat. No. 4,906,256, FIG. 3. A two-stage system is complex compared with a one-stage, uses more controls and is more costly, since two sets of most components are needed.

Pervaporation

The discussion above concerns separations in which the feed to the membrane system is a gas or vapor. However, a similar situation obtains when components are removed from liquid streams by pervaporation. In pervaporation, the liquefied permeate may be subjected to recovery or further purification, by decantation, distillation, solvent extraction or adsorption, for example, and the impure, non-product stream from the decanter or other recovery unit may be passed to the feed side of the pervaporation unit for further treatment. Mixing the non-product stream from the recovery unit with the raw, incoming feed solution can give rise to problems similar to those discussed above for gas or vapor separation.

Gas Separation

Membrane separation systems are used for a number of gas treatment applications. In applications where the goal is to produce an enriched permeate product, a two-stage system is often required to achieve a high product concentration. The residue, or reject, stream from the second membrane stage is usually returned to the inlet of the first stage. Thus, the second stage is analogous to the recovery unit in parent applications Ser. No. 635,919, now U.S. Pat. No. 5,071,451, and 803,109, now U.S. Pat. No. 5,147,550, that is, it is analogous to the condenser in the vapor embodiments, or the decanter in the pervaporation embodiments. If the residue stream from the second membrane stage is very concentrated compared with the incoming feed stream to the first stage, similar problems to those described for vapor separation and pervaporation occur, and the membrane area and pump capacity of the first stage are adversely affected.

SUMMARY OF THE INVENTION

The invention relates to an improved and advantageous arrangement of membrane modules that allows better performance of gas, vapor or liquid separation systems.

The invention employs the same principle as that recognized in parent applications Ser. No. 635,919, now U.S. Pat. No. 5,071,451, and Ser. No. 803,109, now U.S. Pat. No. 5,147,550. These applications dealt with membrane vapor separation or pervaporation systems incorporating a main membrane separation unit, a pump or other unit to provide a driving force for membrane permeation, and a recovery unit for removing product from the permeate stream exiting the driving means. The invention involved installing a small auxiliary membrane unit across the driving and recovery units, thereby balancing the concentrations of the incoming and recycle streams and improving the efficiency of the one-stage system, as well as achieving some of the advantages of a two-stage system without adding a second stage.

The present invention relies on the same concept, namely that of adding one or more auxiliary membrane modules to enhance the performance of the main unit. The present invention differs from the inventions claimed in the parent applications in that the auxiliary modules are not mounted across a non-membrane recovery unit, but across the second stage of a two-stage membrane separation system. The driving force for the auxiliary modules is provided, as in the parent applications, by the pump or other driving unit for the first membrane stage. Thus the second stage is analogous to the recovery unit in the parent applications. The auxiliary module or modules provides additional treatment of the residue stream from the second membrane stage, but are driven by the first stage driving unit. In cases where the residue, or reject, stream from the second stage is to be recirculated to the feed side of the first stage, the auxiliary modules can be used to adjust the composition of the reject stream to match the composition of the incoming feed stream, so that the recirculating stream does not adversely affect the performance and efficiency of the first stage.

The invention is particularly useful in any membrane separation operation involving gas separation, vapor separation or pervaporation in which a two-stage system design is to be used, and where it is desirable to improve the efficiency of the two-stage system.

It is to be understood that the above summary and the following detailed description are intended to explain and illustrate the invention without restricting its scope.

DETAILED DESCRIPTION OF THE INVENTION

Vapor Separation

In the process of the invention, a feed gas stream containing a vapor is passed through a membrane separation step and a recovery step. For convenience, the figures and their descriptions show a recovery step achieved by condensation of the vapor. However, other recovery steps, including various kinds of extraction, absorption and adsorption steps are also within the scope of the invention. The vapor may be of an organic compound or mixture of compounds, such as a hydrocarbon, a halogenated hydrocarbon or the like, or an inorganic compound, such as water, sulfur dioxide, ammonia, etc. The other component or components of the feed gas stream may be other vapors, nitrogen, air or any other gas.

Figure 1:
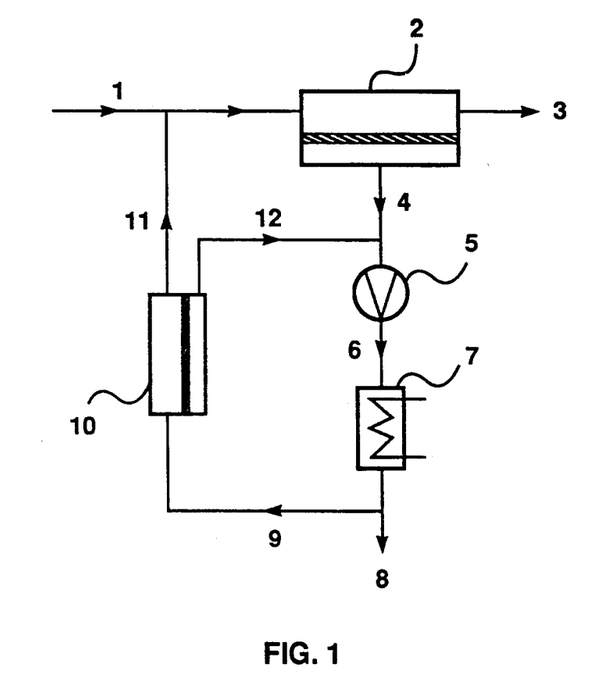
FIG. 1 is a schematic drawing showing a membrane separation process carried out with a system including a main membrane unit, a pump, a condenser and an auxiliary membrane module or modules.

A basic embodiment of the invention is shown in FIG. 1. Referring to this figure, a vapor-containing feed gas stream, 1, passes to a membrane separation unit, 2, containing one or more membranes. The membrane separation step normally involves running the feed gas stream across a membrane that is selectively permeable to the vapor that is to be removed. The vapor is concentrated in the stream, 4, permeating the membrane; the residue, non-permeating, stream, 3, is correspondingly depleted in vapor.

The membrane may take the form of a homogeneous membrane, a membrane incorporating a gel or liquid layer, or any other form known in the art. Two types of membrane are preferred for use in vapor separation embodiments of the invention. The first is a composite membrane comprising a microporous support, onto which the permselective layer is deposited as an ultrathin coating. Composite membranes are preferred when a rubbery polymer is used as the permselective material. The second is an asymmetric membrane in which the thin, dense skin of the asymmetric membrane is the permselective layer. Both composite and asymmetric membranes are known in the art. The form in which the membranes are used in the invention is not critical. They may be used, for example, as flat sheets or discs, coated hollow fibers, spiral-wound modules, or any other convenient form.

The driving force for membrane permeation is the pressure difference between the feed and permeate sides. The presssure drop across the membrane can be achieved by pressurizing the feed, by evacuating the permeate or by both. In FIG. 1, the feed gas is supplied to the membrane separation unit at atmospheric pressure or slightly above, and a vacuum pump, 5, is used to lower the pressure on the permeate side.

Stream, 6, from the vacuum pump is subjected to a condensation step. In general, the condensation step may involve chilling, compression or a combination of these. In FIG. 1, the vapor-enriched stream passes without compression to condenser, 7. The condenser may be water cooled, or may employ refrigerants that can take the gas down to lower temperatures, and produces a stream, 8, of liquified vapor.

The amount of vapor that can be removed from the vapor-enriched stream by condensation depends on the vapor concentration, the vapor/liquid equilibrium and the operating conditions under which the condensation is performed. In practice, the economics of achieving extremely high pressures and extremely low temperatures usually limit the performance of the condensation step in recovering liquified vapor. There are also constraints on the removal or recovery achieved by the other types of removal processes.

The non-condensed gas fraction, 9, emerging from the condenser contains a higher vapor concentration than the feed gas, and may contain a concentration as high as five times, 10 times or more than the feed concentration. This condenser vent gas is passed through an auxiliary membrane module or modules, 10, which, like the main membrane separation unit, normally contains a vapor-selective membrane. The volume of the condenser vent gas stream is much smaller than that of the feed gas stream, so the membrane area required for the auxiliary module is small compared with the main unit. The auxiliary module, 10, is connected on its permeate side upstream of the vacuum pump, 6. Thus the driving force for auxiliary membrane permeation is provided by the pressure difference between the vacuum and exhaust sides of the vacuum pump. The concentrated vapor stream, 12, from the auxiliary module joins with vapor-enriched stream, 4, from the main membrane unit and passes again through the vacuum pump and condenser. The residue stream, 11, from the auxiliary unit is recirculated to the feed side of the main membrane unit. The concentration of vapor in the stream 11 depends on the membrane area contained in the auxiliary module. Preferably, the membrane area is such that there is not a big difference between the vapor concentrations in streams 11 and 1. Most preferably, stream 11 should have a concentration about the same as stream 1.

Figure 2:
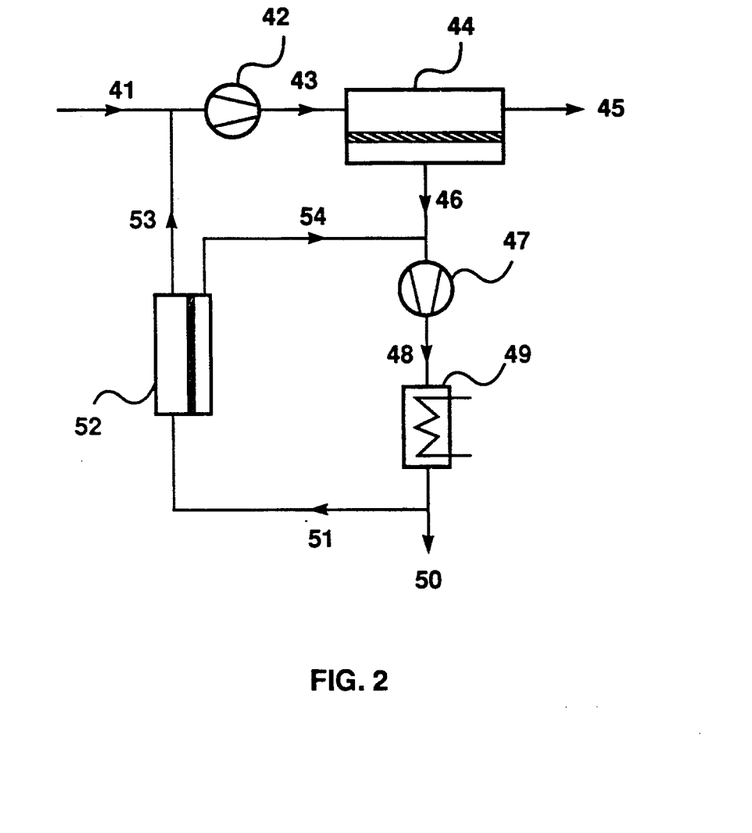
FIG. 2 is a schematic drawing showing a membrane separation process carried out with a system including a compressor, a main membrane unit, a condenser and an auxiliary membrane module or modules.

An alternative embodiment of the invention is shown in FIG. 2. This arrangement differs from that of FIG. 1 in that the feed gas stream is supplied to the main membrane unit at high pressure, so it is possible to operate at atmospheric pressure on the permeate side. Referring now to FIG. 2, a vapor-containing feed gas stream, 41, passes to a compressor, 42. Preferably, this raises the feed gas pressure to a value in the range 1-20 atmospheres. Pressurized feed gas stream, 43, then passes to membrane separation unit, 44, containing one or more membranes. The vapor is concentrated in stream, 46, permeating the membrane; the residue, non-permeating, stream, 45, is correspondingly depleted in vapor.

In this case, the driving force for membrane permeation is provided by the pressurized feed; the permeate side of the membrane is at, or close to, atmospheric pressure. Stream, 46, from the membrane passes to compressor, 47, emerging as pressurized stream, 48. It is then condensed in condenser, 49, and produces a stream, 50, of liquified vapor.

The non-condensed gas fraction. 51, is passed through an auxiliary membrane module or modules, 52, connected on its permeate side upstream of compressor, 47. The driving force for auxiliary membrane permeation is provided by the pressure difference between the pressurized exhaust from the condenser and the low-pressure side of the compressor. The concentrated vapor stream, 54, from the auxiliary module joins with vapor-enriched stream, 46, from the main membrane unit and passes again through the compressor and condenser. The residue stream, 53, from the auxiliary unit is recirculated to the feed side of the main membrane unit. The concentration of vapor in stream 53 may be tailored as discussed above.

From the above discussion it may be seen that various ways of providing the driving force for membrane permeation in the main and auxiliary membrane units are possible within the scope of the invention. What is required is that there be some component or set of components on the permeate side of the main membrane unit that changes the pressure of the gas stream passing through it, such as any type of pump, compressor, eductor or the like. What is further required is that at least part of the pressure change caused by that component or components is tapped to provide the driving means for the auxiliary module(s).

FIGS. 1 and 2 show a one-stage main membrane unit. However, it will be apparent that the same principle can be applied where the main membrane unit includes multiple membrane stages or steps, such as a two-step system, a two-stage system or other combinations.

Pervaporation

Figure 3:
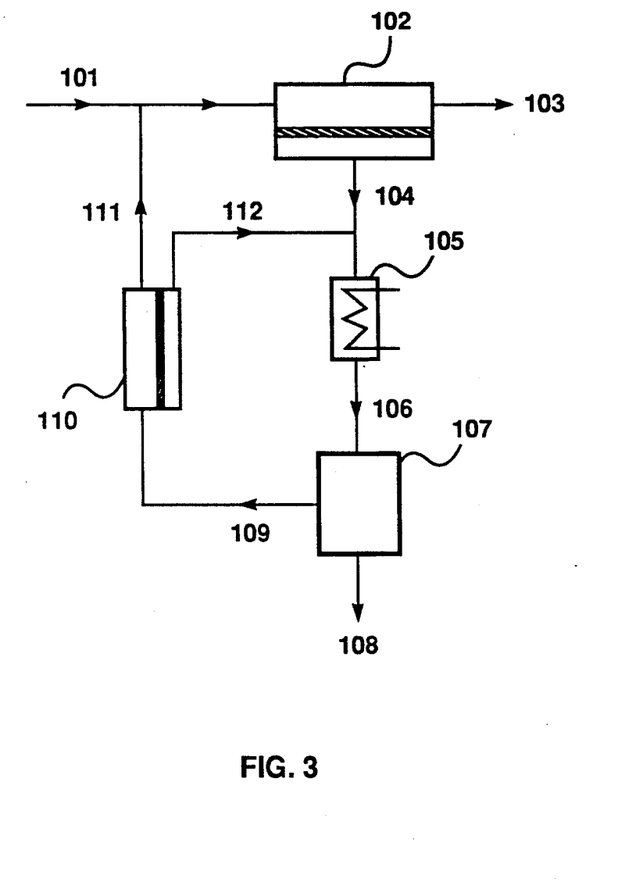
FIG. 3 is a schematic drawing showing a pervaporation/purification process carried out with a system including a main pervaporation unit, a condenser, a recovery or further purification unit and an auxiliary membrane module or modules.
Figure 4:
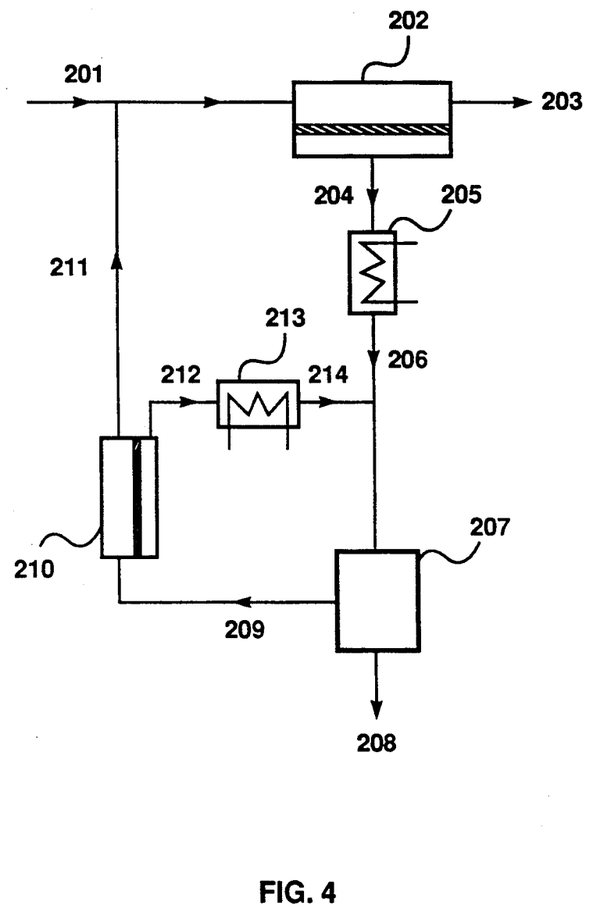
FIG. 4 is a schematic drawing showing a pervaporation/purification process carried out with a system including a main pervaporation unit, a condenser, a recovery or further purification unit, an auxiliary membrane module or modules and a second condenser.

FIGS. 3 and 4 show embodiments of the invention as it relates to pervaporation. A convenient mathematical method of describing pervaporation is to divide the separation into two steps. The first is evaporation of the feed liquid to form a hypothetical saturated vapor phase on the feed side of the membrane. The second is permeation of this vapor through the membrane to the low pressure permeate side of the membrane. Although no evaporation actually takes place on the feed side of the membrane during pervaporation, this approach is mathematically simple and is thermodynamically completely equivalent to the physical process.

In pervaporation, transmembrane permeation is induced by maintaining the vapor pressure on the permeate side lower than the vapor pressure of the feed liquid. The permeate side vapor pressure can be reduced, for example, by drawing a vacuum on the permeate side of the membrane, by sweeping the permeate side to continuously remove permeating vapor, or by cooling the permeate vapor stream to induce condensation. The feed solution may also be heated to raise the vapor pressure on the feed side.

FIG. 3 shows a pervaporation embodiment that corresponds to the gas separation embodiment of FIG. 1. The pervaporation system of FIG. 3 differs from the gas separation design of FIG. 1 in that the condenser provides a driving force for transmembrane permeation and the recovery or further purification is provided by a decanter, distillation column, adsorbent bed, extraction process or the like. Referring now to FIG. 3, a solution, 101, containing a component to be separated, passes to a pervaporation unit, 102, containing one or more membranes. Preferably, although not essentially, solution 101 is warmed before entering the pervaporation unit to raise the vapor pressure on the feed side and augment the driving force provided by the condenser. The pervaporation step normally involves running the feed solution across a membrane that is selectively permeable to the component that is to be removed. That component is concentrated in the vapor stream, 104, permeating the membrane; the residue, non-permeating, stream, 103, is correspondingly depleted in the component.

As with the gas separation designs, the membrane may take any of the membrane forms known in the art. For pervaporation, composite membranes, asymmetric membranes or ion-exhange membranes are preferred. Any convenient type of module may be used.

In FIG. 3, the driving force for transmembrane permeation is provided by condenser, 105, which liquefies the permeating vapor and thereby maintains a low partial pressure on the permeate side. Liquid stream, 106, from the condenser passes to the recovery, second separation or further purification unit, 107. A variety of techniques can be used to further purify the condensed permeate. If the content of the permeate and the mutual solubilities of the components are appropriate, the permeate may form two phases, for example an aqueous phase and an organic phase. Further purification could then be achieved by separating the two phases in a decanter. If the permeate forms a single phase, it can be further separated by distillation, adsorption or solvent extraction, for example. In FIG. 3, stream 108 represents the stream rich in the desired component; stream 109 represents the residual, non-product stream. For example, if the purpose of the pervaporation/further purification process were to separate an organic compound from water, stream 108 would be the organic-rich stream and stream 109 would be the residual aqueous stream. As in the gas separation applications described above, the composition of stream 109 may be very different from that of imcoming feed stream 101. Stream 109 may be saturated with organic, for example.

The non-product stream, 109, is passed through an auxiliary pervaporation module or modules, 110. Preferably, before entering the module, stream 109 is heated to increase the feed side vapor pressure. This may be done by running stream 109 through a heat exchanger in heat-exchanging contact with, for example, stream 103. The auxiliary module, 110, is connected on its permeate side upstream of the condenser, 105. Thus a driving force for auxiliary membrane permeation is provided by the condenser. The concentrated vapor stream, 112, from the auxiliary module passes, together with stream 104 or separately, through the condenser and the further purification process. The residue stream, 111, from the auxiliary unit is recirculated to the feed side of the main membrane unit. The composition of stream 111 depends on the membrane area contained in the auxiliary module. Preferably, the membrane area is such that there is not a big difference between the compositions of streams 111 and 101. Most preferably, stream 111 should have a concentration about the same as stream 101.

In addition to the basis elements shown in FIG. 3, a pervaporation system commonly includes a small vacuum pump, on the permeate side, to remove any noncondensable gas that may be present in the system. The system may also include a pump to pump the condensed permeate to the recovery or further purification unit, 107, and a pump to pump the non-product stream from the recovery unit to the auxiliary module or modules.

An alternative embodiment of the invention as it relates to pervaporation is shown in FIG. 4. The pervaporation system of FIG. 4 differs from that of FIG. 3 in that a separate condenser is used to drive the auxiliary modules, but the recovery or further purification unit handles the condensates from both condensers. Other optional equipment, such as pumps to remove noncondensable gas and to supply liquid to the recovery unit may serve both condensers. Less desirably, separate pumps may be provided to handle each condenser.

Referring now to FIG. 4, a solution, 201, containing a component to be separated, passes to a pervaporation unit 202, containing one or more membranes. The pervaporation step normally involves running the feed solution across a membrane that is selectively permeable to the component that is to be removed. That component is concentrated in the vapor stream 204, permeating the membrane; the residue, non-permeating, stream, 203, is correspondingly depleted in the component. As with the embodiment of FIG. 3, the solution may be heated before entering the pervaporation unit.

The membranes and modules may be chosen and configured according to the same teachings as given for the FIG. 3 embodiment. A driving force for transmembrane permeation is provided by condenser, 205, which liquefies the permeating vapor and thereby maintains a low partial pressure on the permeate side. Liquid stream 206, from the condenser passes to the recovery or further purification unit, 207, which, as in FIG. 3, may be a decanter, distillation column, etc. Stream 208 represents the stream rich in the desired component; stream 209 represents the non-product stream. Stream 209 is passed through an auxiliary pervaporation module or modules, 210. Preferably, before entering the module, stream 209 is heated to increase the feed side vapor pressure. This may be done by running stream 209 through a heat exchanger in heat-exchanging contact with, for example, stream 203. The auxiliary module, 210, is connected on its permeate side to auxiliary condenser, 213. The concentrated vapor stream, 212, from the auxiliary module passes through condenser, 213, emerging as liquid stream, 214, which in turn passes, together with stream 206 or separately, to the recovery or further purification unit, 207. The residue stream, 211, from the auxiliary unit is recirculated to the feed side of the main membrane unit. The design of FIG. 4 is particularly useful when the feed liquid contains three components of differing physical properties, such as a hydrophobic organic compound, an organic compound moderately soluble in water, and water.

FIGS. 3 and 4 show a one-stage pervaporation unit. However, it will be apparent that the same principle can be applied where the main pervaporation unit includes multiple membrane stages or steps, such as a two-step system, a two-stage system or other combinations.

FIGS. 3 and 4 show systems and processes in which a driving means for transmembrane permeation, equivalent to the pressure-changing means of the vapor separation embodiments, is provided by the condenser on the permeate side of the pervaporation unit, optionally augmented by heating the feed stream. Embodiments in which the driving force is provided by a vacuum pump instead of a condenser on the permeate side, a vacuum pump combined with a condenser, an eductor or any other means that would cause transmembrane permeation to occur are also within the scope of the invention.

Two-Stage Systems

Figure 5:
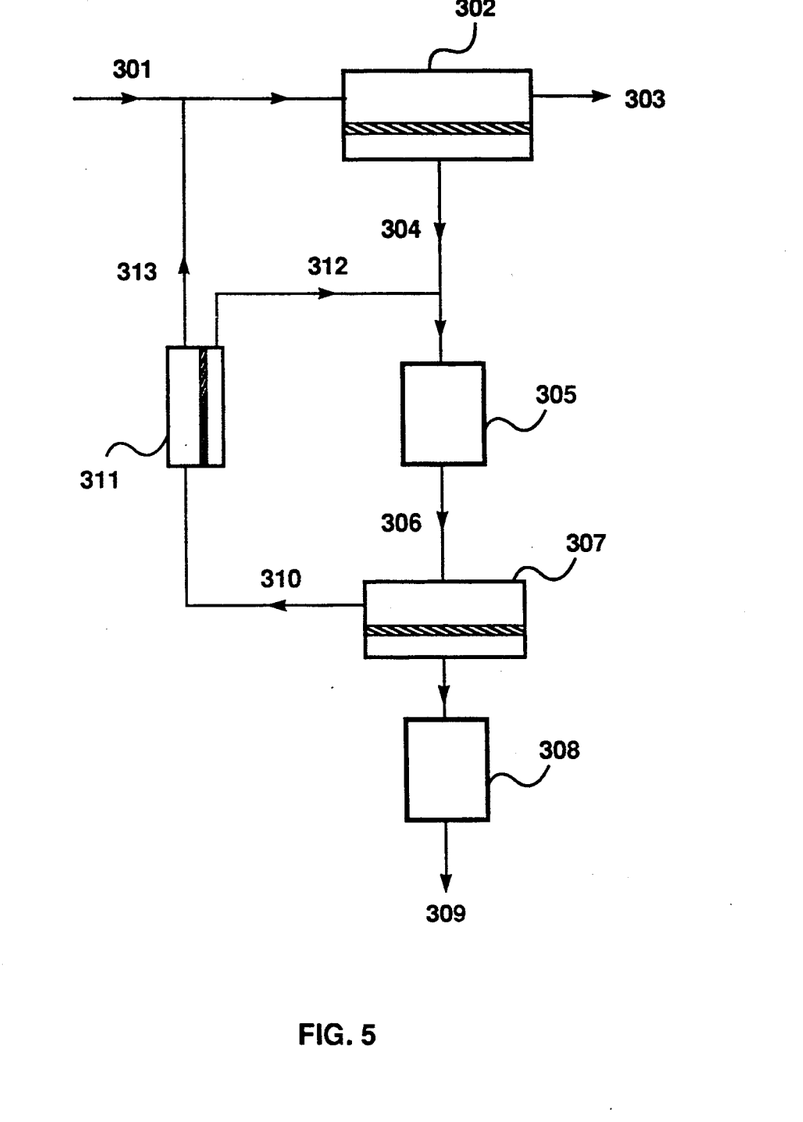
FIG. 5 is a schematic drawing showing a two-stage membrane separation process carried out with a system including a two-stage membrane unit, a driving unit for each stage and an auxiliary membrane module or modules.

FIGS. 1–4 relate to embodiments in which a one-stage membrane separation system is used. Although the invention is useful in one regard in that it can often avoid the need for a second stage, many advantages can also be obtained by using an auxiliary module or modules in conjunction with a two-stage membrane system. FIG. 5 shows such an embodiment. Referring now to this figure, a fluid, 301, which may be gas or liquid, containing a component to be separated, passes to a first stage membrane separation unit, 302, containing one or more membranes. The membrane separation step normally involves running the feed fluid across a membrane that is selectively permeable to the component that is to be removed. That component is concentrated in the membrane permeate stream, 304; the residue, non-permeating stream, 303, is correspondingly depleted in the component.

As with the designs previously described, the membrane may take any form, including composite membranes, asymmetric membranes, ion-exchange membranes, facilitated or coupled transport membranes, etc. Likewise, the form of the module containing the membrane may be any appropriate form, such as plate-and-frame, potted fiber or spiral-wound.

The driving force for transmembrane permeation in the first stage is provided by a driving means, 305. In the case where the fluid to be treated is a gas, the driving unit is most commonly a vacuum pump that creates a pressure drop across the main membrane unit by drawing a partial vacuum on the permeate side of the membrane. As in the FIGS. 1 and 2 embodiments described above, the driving unit could also be any other type of pump, such as a compressor, eductor or the like, that changes the pressure of the gas or vapor passing through it and draws gas away from the permeate side of the membrane. In the case where the fluid to be treated is a liquid, the driving unit is most commonly a condenser, as in the pervaporation embodiments above, but could also be a vacuum pump, eductor, etc.

The permeate stream, 304 is drawn through the driving unit, 305 and emerges as stream, 306, which is passed to the second-stage membrane unit, 307. The driving force for transmembrane permeation in the second stage is provided by a second driving unit, 308, which again may be a vacuum pump, compressor, condenser, eductor, etc. as appropriate. The permeate stream from the second membrane stage is withdrawn as product stream, 309. The residue stream, 310, from the second stage is passed through an auxiliary membrane unit, 311, which, like the main membrane separation unit, normally contains membrane selective to the component to be separated. The auxiliary unit is connected on its permeate side upstream of the driving unit for the main first stage. Thus a driving force for auxiliary membrane permeation is provided by the pump or other means that drives the main first stage. The auxiliary module(s) further treat the residue from the second stage to produce a residue stream, 313, the composition of which can be varied by varying the membrane area contained in the auxiliary module(s). In FIG. 5, the residue stream, 313, from the auxiliary unit is shown as recirculated to the feed side of the first stage membrane unit. Such an arrangement is convenient, but not mandatory. As in the embodiments discussed above, designs in which the residue stream is not recirculated, but passes to some other destination, will find many useful applications and are contemplated within the scope of the invention. If stream 313 is recirculated, it may be preferable that the membrane area is such that there is not a big difference between the compositions of streams 301 and 313 and most preferably, that stream 313 should have a concentration about the same as stream 301. If the goal of the process is to maximize the concentration of stream 309, however, it may be preferable to size the auxiliary membrane unit to keep the concentration of stream 313 low, such as well below the concentration of stream 301. This arrangement maximizes the retention of the component to be separated in the recycle loop formed by the auxiliary unit and enables the concentration of stream 309 to reach a high value.

The auxiliary unit produces a permeate stream, 312, which is passed back to the inlet side of the driving means for the first stage membrane unit.

The membranes used in the main membrane unit first stage and second stage, and the auxiliary modules, may be of the same type or different. For example, where an organic compound is to be separated from air, both main unit stages and the auxiliary unit may contain silicone rubber membranes. Optionally, although both units may contain membranes selective to the component that is to be separated, the selectivities of the membranes may be different. For example, the main membrane unit, which has to process the bulk of the feed fluid, may contain membranes of high flux and moderate selectivity. The auxiliary membrane unit, which usually deals with a small feed stream, may contain membranes of high selectivity but lower flux. Likewise the first stage of the main membrane unit may contain one type of membrane, and second stage of the main membrane unit and the auxiliary unit may contain another type, or all three units may contain different types. Useful embodiments are also possible using membranes of unlike selectivities in the main unit and the auxiliary modules.

FIG. 5 shows a two-stage arrangement in which a second driving unit, 308, is provided for the second stage. It will be appreciated by those of skill in the art that the second driving unit may be dispensed with in some embodiments. For example, if the feed stream 301 is at above atmospheric pressure, driving unit 305 for the first stage may be a compressor. In this case, the outlet stream from the driving unit will also be at elevated pressure sufficient to provide a driving force for transmembrane permeation in the second stage and no separate driving unit on the permeate side of the second stage may be necessary.

Processes of the type shown in FIG. 5, with or without a second driving unit for the second stage, are in some aspects analogous to the inventions in the parent applications that use a one-stage membrane separation system followed by a non-membrane recovery unit. The second membrane stage takes the place of the recovery unit in these cases. In other aspects, the invention improves the performance and efficiency of a conventional two-stage system. Frequently, a separation can be performed with the arrangement of FIG. 5 using less energy and membrane area than would be needed to achieve the same separation with a conventional two-stage system design. A non-membrane recovery unit may be used in conjunction with the invention in this aspect to further purify or separate the product stream from the second stage.

In either aspect, the auxiliary unit can be used to build up the concentration of the product stream to a target level. Applications where the invention in this form is particularly useful are in gas separation and pervaporation. Pervaporation can be used to dehydrate organic solutions, to remove organic compounds from water or to separate mixtures of organics. If the components to be separated are of very different properties, such as benzene and water, and if reasonably selective membranes are available, then a conventional membrane system will often be able to provide a good enough treatment to recover separate organic and aqueous phases by decantation. If the components have a high mutual solubility or miscibility, such as acetone and water, or form an azeotrope, such as toluene/octane or many other organic mixtures, then a one-phase product stream results. Furthermore, unless the separation factor is high, the product composition may still be near the azeotrope and further separation by distillation may still be difficult. The process of the invention provides an attractive method for obtaining a relatively good separation from a relatively unselective membrane by cycling the product in the auxiliary loop until it has reached a target concentration.

Representative Applications

The systems and processes of the invention could be used for diverse applications, including:

1. Separation of oxygen or nitrogen from air.
2. Separation of hydrogen from nitrogen, methane, carbon monoxide or other gases.
3. Separation of carbon dioxide from nitrogen or other gases in natural gas and oil drilling applications.
4. Sour gas sweetening.
5. Other natural gas processing: Btu control, dewpoint control, NGL recovery, etc.
6. Removal of acid gases from industrial air emissions.
7. Other air pollution control applications, e.g. removal of hydrocarbons, chlorinated hydrocarbons, CFCs, carcinogens from industrial air emissions.
8. Dehydration of many types of gas stream.
9. Separation of closely boiling mixtures or azeotropes.
10. Dehydration of organic liquids.
11. Clean-up of groundwater contamination.
12. Removal of contaminants from industrial wastewater.

13. Other water purification.

14. Treatment of industrial process streams containing alcohols, acetone, phenols, other moderately water-soluble or miscible compounds.

The invention is now further illustrated by the following examples, which are intended to be illustrative of the invention, but are not intended to limit the scope or underlying principles in any way.

EXAMPLES

All of the examples compare the performance of different types of membrane arrangement. The examples are computer calculations, performed using computer modeling programs created by Membrane Technology and Research, Inc., and based in part on the gas permeation equations for cross-flow conditions described by Shindo et al., "Calculation Methods for Multicomponent Gas Separation by Permeation," *Sep. Sci. Technol.* 20, 445–459 (1985).

The examples are in two groups, A and B. The first group concerns treatment of a gas stream containing CFC-11; the second a gas stream containing carbon dioxide. In each case, target values for the membrane residue stream and the product stream were set and a comparison was made of the energy requirements and membrane area needed to reach the target with different membrane arrangements.

GROUP A EXAMPLES

The calculations described above were performed using the following assumptions:

| | |
|---|---|
| Feed gas composition: | 1% CFC-11 in air |
| Feed pressure: | 15 psia |
| Feed flow rate: | 100 scfm |
| Membrane selectivity: | 25 |
| Residue CFC concentration: | 0.1% |
| Permeate pressure: | 1 psia |
| Product stream CFC concentration: | Variable from 10% to 60% |

EXAMPLE 1 (not in accordance with the invention)

Single-stage Membrane Separation Unit with Recycle of the Membrane Permeate Stream to the Feed Side of the Membrane Unit The computer calculations were performed for a one-stage system in which the permeate stream is cycled back to the feed side of the membrane, forming a loop. Gas cycles through the loop until the desired product concentration has been reached. The loop is then tapped to yield a product stream of CFC concentration varying from 10% to 50%. The permeate pump capacity and membrane area for each product concentration are shown in Table 1.

TABLE 1

| Pump capacity (hp) | Membrane area (m$^2$) | Product conc. (%) |
|---|---|---|
| 43.5 | 372 | 10 |
| 64.5 | 494 | 20 |
| 83.0 | 561 | 30 |
| 104.5 | 611 | 40 |
| 133.5 | 658 | 50 |

EXAMPLE 2 (not in accordance with the invention)

Single-stage Membrane Separation Unit with Auxiliary Modules

The calculations described in Example 1 were repeated using a system design in which a set of auxiliary modules is installed across the main unit permeate pump. The permeate from the auxiliary modules is returned upstream of the main unit permeate pump and the residue stream from the auxiliary unit is returned to the feed side of the main membrane unit. The residue concentration from the auxiliary modules was fixed at 1% to match the incoming feed concentration. The product stream was withdrawn from the loop formed by the auxiliary modules and the permeate pump. The calculated membrane areas and pump capacities for each product concentration are listed in Table 2.

TABLE 2

| Pump capacity (hp) | Membrane area (m$^2$) | | | Product conc. (%) |
|---|---|---|---|---|
| | First stage | Aux. module | Total | |
| 27.9 | 220 | 40 | 260 | 10 |
| 34.5 | 235 | 60 | 295 | 20 |
| 39.9 | 230 | 80 | 310 | 30 |
| 47.6 | 230 | 100 | 330 | 40 |
| 57.1 | 225 | 120 | 345 | 50 |

Example 3 (not in accordance with the invention)

Two-stage Membrane Separation Unit

The computer calculations were performated for a two-stage system in which the residue stream from the second stage is recycled to the feed side of the first stage and the permeate from the second stage forms the product stream. Calculations were performed for product streams varying in concentration from 10% to 61%. The permeate pump capacity and membrane area for each product concentration is shown in Table 3.

TABLE 3

| Pump capacity (hp) | | | Membrane area (m$^2$) | | | Product conc. (%) |
|---|---|---|---|---|---|---|
| First pump | Second pump | Total | First stage | Second stage | Total | |
| 21.1 | 7.3 | 28.4 | 203 | 67 | 270 | 10 |
| 24.4 | 3.4 | 27.8 | 235 | 30 | 265 | 20 |
| 28.1 | 2.1 | 30.2 | 270 | 17 | 287 | 30 |
| 32.4 | 1.6 | 34.0 | 310 | 11 | 321 | 40 |
| 36.8 | 1.2 | 38.0 | 350 | 8 | 358 | 50 |
| 40.9 | 1.0 | 41.9 | 385 | 5 | 390 | 61 |

EXAMPLE 4

Two-stage Membrane Separation Unit with Auxiliary Modules

The calculations described in Example 3 were repeated using a system design as in FIG. 5. The residue concentration from the auxiliary modules was fixed at 1% to match the incoming feed concentration. The calculated membrane areas and pump capacities required to achieve the desire performance with a system design as in FIG. 5 are listed in Table 4.

TABLE 4

| Pump capacity (hp) | | | Membrane area (m$^2$) | | | | Product conc. (%) |
|---|---|---|---|---|---|---|---|
| First pump | Second pump | Total | First stage | Second stage | Aux. module | Total | |
| 21.3 | 0.1 | 21.4 | 205 | 0 | 67 | 272 | 10 |

TABLE 4-continued

| Pump capacity (hp) | | | Membrane area (m²) | | | | Product conc. (%) |
|---|---|---|---|---|---|---|---|
| First pump | Second pump | Total | First stage | Second stage | Aux. module | Total | |
| 24.1 | 0.1 | 24.2 | 230 | 2 | 30 | 262 | 20 |
| 26.1 | 0.1 | 26.2 | 230 | 20 | 18 | 268 | 30 |
| 27.8 | 0.1 | 27.9 | 230 | 35 | 12 | 277 | 40 |
| 29.7 | 0.1 | 29.8 | 238 | 42 | 8 | 288 | 50 |

EXAMPLE 5

Comparison of Examples 1, 2, 3 and 4; 20% Product Concentration

The data calculated for Examples 1, 2, 3 and 4 above were compared. In particular, we considered the pump capacity and membrane area requirements for the four system designs to achieve a CFC concentration of 20% in the product stream. The comparison is shown in Table 5.

TABLE 5

| Membrane Arrangement | Total Pump Capacity (hp) | Total Membrane Area (m²) |
|---|---|---|
| One-stage with recycle | 64.5 | 494 |
| One-stage with aux. modules | 34.5 | 295 |
| Two-stage | 27.8 | 265 |
| Two-stage with aux. modules | 24.2 | 262 |

This table shows that the design of the invention uses less energy and less membrane area than any of the other system designs.

EXAMPLE 6

Comparison of Examples 1, 2, 3 and 4; 50% Product Concentration

The data calculated for Examples 1, 2, 3 and 4 above were compared. In particular, we considered the pump capacity and membrane area requirements for the three system designs to achieve a CFC concentration of 50% in the product stream. The comparison in shown in Table 6.

TABLE 6

| Membrane Arrangement | Total Pump Capacity (hp) | Total Membrane Area (m²) |
|---|---|---|
| One-stage with recycle | 133.5 | 658 |
| One-stage with aux. modules | 57.1 | 345 |
| Two-stage | 38.0 | 358 |
| Two-stage with aux. modules | 29.8 | 288 |

This table shows that the design of the invention uses less energy and membrane area than any other system design. In particular, the process of the invention uses only 78% of the energy and 80% of the membrane area of the conventional two-stage design.

GROUP B EXAMPLES

The calculations described above were performed using the following assumptions:

| | |
|---|---|
| Feed gas composition: | 0.5% carbon dioxide in nitrogen |
| Feed pressure: | 15 psia |
| Feed flow rate: | 100 scfm |
| Membrane selectivity: | 10 (silicone rubber) |
| Membrane selectivity: | 40 (Pebax) |
| Residue $CO_2$ concentration: | 0.1% |
| Permeate pressure: | 1 psia |
| Product stream $CO_2$ concentration: | Variable from 5% to 15% |

EXAMPLE 7 (not in accordance with the invention)

Single-stage Membrane Separation Unit with Recycle of the Membrane Permeate Stream to the Feed Side of the Membrane Unit The computer calculations were performed for a one-stage system in which the permeate stream is cycled back to the feed side of the membrane, forming a loop. Gas cycles through the loop until the desired product concentration has been reached. The loop is then tapped to yield a product stream of carbon dioxide concentration varying from 5% to 15%. The membrane was assumed to be silicone rubber, with a moderate selectivity but high carbon dioxide flux. The permeate pump capacity and membrane area for each product concentration is shown in Table 7.

TABLE 7

| Pump capacity (hp) | Membrane area (m²) | Product conc. (%) |
|---|---|---|
| 62.3 | 600 | 5 |
| 89.7 | 850 | 10 |
| 107.9 | 1,000 | 15 |

EXAMPLE 8 (not in accordance with the invention)

Single-stage Membrane Separation Unit with Recycle of the Membrane Permeate Stream to the Feed Side of the Membrane Unit The computer calculations of Example 7 were repeated using a more selective ($\alpha=40$), but lower flux membrane made from Pebax, a polyamide-polyether block copolymer. The results are shown in Table 8.

TABLE 8

| Pump capacity (hp) | Membrane area (m²) | Product conc. (%) |
|---|---|---|
| 20.2 | 3,100 | 5 |
| 29.9 | 4,500 | 10 |
| 36.3 | 5,300 | 15 |

Comparing Table 8 with Table 7, it may be seen that a lesser driving force but a much greater membrane area is required if the higher selectivity Pebax membrane is used.

EXAMPLE 9 (not in accordance with the invention)

Single-stage Membrane Separation Unit with Auxiliary Modules

The calculations described in Examples 8 and 9 were repeated using a system design in which a set of auxiliary modules is installed across the main unit permeate pump. The permeate from the auxiliary modules is returned upstream of the main unit permeate pump and the residue stream from the auxiliary unit is returned to the feed side of the main membrane unit. The residue concentration from the auxiliary modules was fixed at about 0.5% to match the incoming feed concentration. The product stream was withdrawn from the loop formed by the auxiliary modules and the permeate pump. A silicone rubber membrane was assumed to be used for the main membrane unit and the Pebax membrane for the auxiliary modules. The calculated membrane areas and pump capacities for each product concentration are listed in Table 9.

TABLE 9

| Pump capacity (hp) | Membrane area (m$^2$) | | | Product conc. (%) |
| --- | --- | --- | --- | --- |
| | First stage | Aux. module | Total | |
| 34.0 | 290 | 550 | 840 | 5 |
| 38.2 | 290 | 1,000 | 1,290 | 10 |
| 40.4 | 290 | 1,100 | 1,390 | 15 |

EXAMPLE 10 (not in accordance with the invention)

Two-stage Membrane Separation Unit

The computer calculations were performed for a two-stage system in which the residue stream from the second stage is recycled to the feed side of the first stage and the permeate from the second stage forms the product stream. A silicone rubber membrane was assumed to be used for the first stage and a Pebax membrane for the second stage. Calculations were performed for product streams varying in concentration from 5% to 15%. The permeate pump capacity and membrane area for each product concentration is shown in Table 10.

TABLE 10

| Pump capacity (hp) | | | Membrane area (m$^2$) | | | Product conc. (%) |
| --- | --- | --- | --- | --- | --- | --- |
| First pump | Second pump | Total | First stage | Second stage | Total | |
| 24.0 | 7.4 | 31.4 | 230 | 1,020 | 1,250 | 5 |
| 28.0 | 4.0 | 32.0 | 270 | 480 | 750 | 10 |
| 34.8 | 2.5 | 37.3 | 330 | 295 | 625 | 15 |

EXAMPLE 11

Two-stage Membrane Separation Unit with Auxiliary Modules

The calculations described in Example 10 were repeated using a system design as in FIG. 5. The residue concentration from the auxiliary modules was fixed at 0.5% to match the incoming feed concentration. A silicone rubber membrane was assumed to be used for the main membrane unit and a Pebax membrane for the second stage and the auxiliary modules. The calculated membrane areas and pump capacities required to achieve the desired performance with a system design as in FIG. 5 are listed in Table 11.

TABLE 11

| Pump capacity (hp) | | | Membrane area (m$^2$) | | | | Product conc. (%) |
| --- | --- | --- | --- | --- | --- | --- | --- |
| First pump | Second pump | Total | First stage | Second stage | Aux. module | Total | |
| 24.0 | 7.4 | 31.4 | 230 | 1,020 | 0 | 1,250 | 5 |
| 28.0 | 4.0 | 32.0 | 270 | 480 | 0 | 750 | 10 |
| 28.0 | 4.5 | 32.5 | 270 | 290 | 200 | 760 | 15 |

EXAMPLE 12

Two-stage Membrane Separation Unit with Auxiliary Modules

The calculations described in Example 11 were repeated, except that in this case silicone rubber membranes were assumed to be used for all membrane units. The calculated membrane areas and pump capacities required to achieve the desired performance with a system design as in FIG. 5 are listed in Table 12.

TABLE 12

| Pump capacity (hp) | | | Membrane area (m$^2$) | | | | Product conc. (%) |
| --- | --- | --- | --- | --- | --- | --- | --- |
| First pump | Second pump | Total | First stage | Second stage | Aux. module | Total | |
| 17.3 | 8.0 | 25.3 | 240 | 64 | 0 | 304 | 5 |
| 28.0 | 4.5 | 32.5 | 265 | 30 | 50 | 345 | 10 |
| 35.3 | 2.5 | 37.8 | 280 | 19 | 85 | 384 | 15 |

EXAMPLE 13

Comparison of Examples 7-12; 15% Product Concentration

The data calculated for Examples 7-12 above were compared. In particular, we considered the pump capacity and membrane area requirements for the five system designs to achieve a carbon dioxide concentration of 15% in the product stream. The comparison is shown in Table 13.

TABLE 13

| Membrane Arrangement | Total Pump Capacity (hp) | Total Membrane Area (m$^2$) |
| --- | --- | --- |
| One-stage with recycle (silicone rubber) | 107.9 | 1,000 |
| One-stage with recycle (Pebax) | 36.3 | 5,300 |
| One-stage with aux. modules (mixed membranes) | 40.4 | 1,390 |
| Two-stage (mixed membranes) | 37.3 | 625 |
| Two-stage with aux. modules (SR membranes only) | 37.8 | 384 |
| Two-stage with aux. modules (mixed membranes) | 32.5 | 760 |

This table shows that the designs of the invention in general use less energy and membrane area than any other system design. In particular, the process of the invention uses only 87% of the energy of the conventional two-stage design when mixed types of membranes are used in both processes. The process of the invention uses only 61% of the membrane area of the conventional two-stage design when silicone rubber membranes are used in all units. It may be seen that by adjusting the membrane types and areas, the invention provides considerable flexibility for tailoring the membrane and energy usage to meet a specific set of circumstances.

We claim:

1. A method for increasing efficiency in a two-stage membrane separation system for removing a component from a fluid stream by gas separation, vapor separation or pervaporation, said system comprising:
   a first membrane unit;

first driving means for said first membrane unit; and
a second membrane unit connected to said first membrane unit and said first driving means such that a permeate stream from said first membrane unit becomes a feed stream for said second membrane unit;

said method comprising:
(a) connecting a permselective membrane to said system in such a way that a driving force for permeation of said permselective membrane is provided by said first driving means;
(b) passing a residue stream from said second membrane unit across said permselective membrane, thereby producing a depleted stream depleted in said component compared with said residue stream and an enriched stream enriched in said component compared with said residue stream;
(c) passing said enriched stream to an inlet side of said first driving means.

2. The method of claim one, wherein said first driving means comprises a pump.

3. The method of claim one, wherein said first driving means comprises a vacuum pump.

4. The method of claim one, wherein said first driving means comprises a compressor.

5. The method of claim one, wherein said first driving means comprises a condenser.

6. The method of claim one, wherein said first driving means comprises an eductor.

7. The method of claim one, wherein said two-stage membrane separation system further comprises second driving means for said second membrane unit.

8. The method of claim one, wherein said fluid is a gas.

9. The method of claim one, wherein said fluid is a liquid.

10. The method of claim one, further comprising:
(d) recirculating said depleted stream to join said fluid stream.

11. A membrane separation process for removing a component from a fluid stream by gas separation, vapor separation or pervaporation, said process comprising:
(a) providing a two-stage membrane separation system comprising:
a first membrane unit;
first driving means for said first membrane unit; and
a second membrane unit connected to said first membrane unit and said first driving means such that a permeate stream from said first membrane unit becomes a feed stream for said second membrane unit;
(b) passing a fluid stream containing a component through said first membrane unit to produce a permeate stream enriched in said component compared with said fluid stream;
(c) passing said permeate stream through said second membrane unit;
(d) withdrawing from said second membrane unit a residue stream depleted in said component compared with said permeate stream;
(e) passing said residue stream across a permselective membrane wherein a driving force for transmembrane permeation is provided by said first driving means;
(f) withdrawing from said permselective membrane a depleted stream depleted in said component compared with said residue stream;
(g) withdrawing from said permselective membrane an enriched stream enriched in said component compared with said residue stream;
(h) passing said enriched stream to an inlet side of said first driving means.

12. The method of claim 11, wherein said first driving means comprises a pump.

13. The method of claim 11, wherein said first driving means comprises a vacuum pump.

14. The method of claim 11, wherein said first driving means comprises a compressor.

15. The method of claim 11, wherein said first driving means comprises a condenser.

16. The method of claim 11, wherein said first driving means comprises an eductor.

17. The method of claim 11, wherein said two-stage membrane separation system further comprises second driving means for said second membrane unit.

18. The method of claim 11, wherein said fluid is a gas.

19. The method of claim 11, wherein said fluid is a liquid.

20. The method of claim 11, further comprising:
(i) recirculating said depleted stream to join said fluid stream.

21. Two-stage apparatus for separating a component from a fluid stream by gas separation, vapor separation or pervaporation, said two-stage apparatus comprising:
(a) a first membrane separation unit;
(b) a first driving means for said first membrane separation unit connected to an outlet from said first membrane separation unit;
(c) a second membrane separation unit; and
(d) a permselective membrane connected to said second membrane unit and said first driving means in such a way that a residue stream from said second membrane unit can pass to a feed side of said permselective membrane and the driving force for permeation of said permselective membrane is provided by said first driving means.

22. The apparatus of claim 21, wherein said first driving means comprises a pump.

23. The apparatus of claim 21, wherein said first driving means comprises a vacuum pump.

24. The apparatus of claim 21, wherein said first driving means comprises a compressor.

25. The apparatus of claim 21, wherein said first driving means comprises a condenser.

26. The apparatus of claim 21, wherein said first driving means comprises an eductor.

27. The apparatus of claim 21, wherein said first membrane separation unit and said second membrane separation unit each contain a membrane of the same type as said permselective membrane.

28. The apparatus of claim 21, wherein said second membrane separation unit contains a membrane of the same type as said permselective membrane.

29. The apparatus of claim 21, wherein said first membrane separation unit and said second membrane separation unit each contain a membrane of a different type from said permselective membrane.

* * * * *